United States Patent
Labbe

(10) Patent No.: US 9,077,271 B2
(45) Date of Patent: Jul. 7, 2015

(54) STARTER CIRCUIT FOR A MOTOR VEHICLE COMPRISING A DEVICE FOR STEPPING-UP THE BATTERY VOLTAGE, AND STARTER EQUIPPED WITH THE CIRCUIT

(75) Inventor: Nicolas Labbe, Lyons (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 141 days.

(21) Appl. No.: 13/991,727

(22) PCT Filed: Nov. 15, 2011

(86) PCT No.: PCT/FR2011/052638
§ 371 (c)(1),
(2), (4) Date: Sep. 13, 2013

(87) PCT Pub. No.: WO2012/076777
PCT Pub. Date: Jun. 14, 2012

(65) Prior Publication Data
US 2013/0342134 A1  Dec. 26, 2013

(30) Foreign Application Priority Data
Dec. 9, 2010  (FR) ................... 10 60300

(51) Int. Cl.
| | |
|---|---|
| *H02P 1/00* | (2006.01) |
| *H02P 1/18* | (2006.01) |
| *F02N 11/08* | (2006.01) |
| *H01F 37/00* | (2006.01) |
| *H02P 1/04* | (2006.01) |
| *F02D 41/14* | (2006.01) |

(52) U.S. Cl.
CPC .......... *H02P 1/18* (2013.01); *F02D 2041/1432* (2013.01); *F02N 11/08* (2013.01); *F02N 2250/02* (2013.01); *H01F 37/00* (2013.01); *H02P 1/04* (2013.01)

(58) Field of Classification Search
USPC .......................................... 318/139
See application file for complete search history.

(56) References Cited

U.S. PATENT DOCUMENTS

| | | | | |
|---|---|---|---|---|
| 3,381,198 | A * | 4/1968 | Kawabe | 318/784 |
| 6,776,273 | B2 * | 8/2004 | Kajino et al. | 192/12 B |
| 2002/0023605 | A1 | 2/2002 | Osada et al. | |
| 2004/0168664 | A1 * | 9/2004 | Senda et al. | 123/179.3 |
| 2008/0211235 | A1 * | 9/2008 | Labbe et al. | 290/38 R |
| 2011/0196570 | A1 * | 8/2011 | Nakamura | 701/29 |

FOREIGN PATENT DOCUMENTS

| | | |
|---|---|---|
| EP | 2 233 732 | 9/2010 |
| JP | 2009185760 A * | 8/2009 |
| WO | WO 2005/076293 | 8/2005 |

* cited by examiner

Primary Examiner — Kawing Chan
(74) Attorney, Agent, or Firm — Berenato & White, LLC

(57) ABSTRACT

The starter motor circuit (1) comprises a combination (10) of a starter motor and of a device (LPF) for stepping up the battery voltage. The device for stepping up the battery voltage is intended to prevent a drop in battery voltage caused by a current spike that appears in a power circuit of the starter motor when power is applied thereto. The starter motor in the conventional way comprises an electric motor (DCM) and an electromagnetic contactor (EC). The device for stepping up the battery voltage is a filtering device of the inductive type which is mounted in series with the electric motor in the power circuit and comprises a casing made of magnetic material, a primary winding circuit intended to be inserted in series in the power circuit, and a secondary winding circuit mounted as a short circuit.

8 Claims, 4 Drawing Sheets

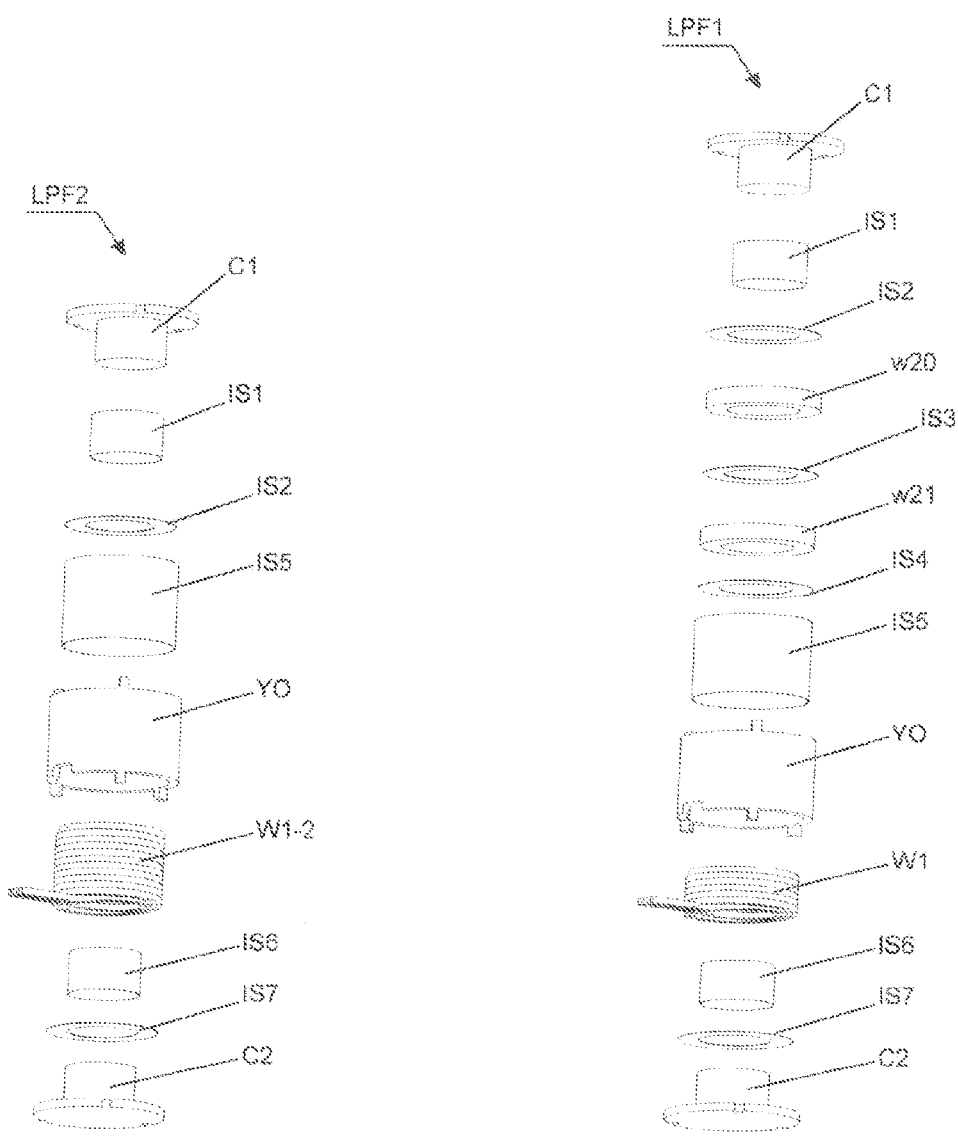
FIG.5B                    FIG.5A

STARTER CIRCUIT FOR A MOTOR VEHICLE COMPRISING A DEVICE FOR STEPPING-UP THE BATTERY VOLTAGE, AND STARTER EQUIPPED WITH THE CIRCUIT

CROSS-REFERENCE TO RELATED APPLICATIONS

This application is a national stage application of International Application No. PCT/FR2011/052638 filed Nov. 15, 2011, which claims priority to French Patent Application No. 10/60300 filed Dec. 9, 2010, of which the disclosures are incorporated herein by reference and to which priority is claimed.

In general, the invention relates to the field of starters for thermal engines in motor vehicles. More particularly, the invention relates to the combination of a starter and a device which makes it possible to step up the voltage at the terminals of the battery of the vehicle when the starter is switched on.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

When a starter is switched on in order to ensure the starting of the thermal engine of the vehicle, a substantial requirement for current arises which is close to the level of the short-circuit current of the starter, i.e. a current of approximately 1000 A. This requirement for current when the starter is switched on then decreases in intensity as the speed of the armature of the starter, corresponding to the rotor of the machine, increases.

2. Description of Related Art Including Information Disclosed Under 37 CFR 1.97 and 1.98

This initial current spike corresponds to a consequent drop in the voltage at the terminals of the battery. Other, less substantial voltage drops then occur during the starting phase, and correspond to passages through successive top dead centres of the thermal engine.

The development of so-called "reinforced" starters which are designed for automatic stop/start systems of the thermal engine (so-called "stop/start" or "stop and go" systems) now impose new constraints on car parts manufacturers, relative to the compliance with minimum voltage thresholds of the battery during the requirement for current when the starter is switched on. Thus, in their specifications, motor vehicle manufacturers define a first voltage threshold which is habitually contained between 7 and 9 V, below which the battery voltage must not descend. For the following voltage drops, corresponding to the top dead centres of the thermal engine, the battery voltage must remain higher than a second voltage threshold, which is habitually contained between 8 and 9 V. During the starting of the thermal engine, the voltage of the vehicle on-board network thus remains at a value which is sufficient to guarantee the required functioning of the parts of the vehicle.

The reinforced starters generally have a power level higher than conventional starters, so as to obtain rapid starting for increased comfort of the users. This results in a higher requirement for power when switching on takes place, and thus to a first drop of the battery voltage which goes beyond the habitual values, in relation to high demands. This creates a genuine difficulty for the designer, since, in order to be at a higher battery voltage, the starter would have to have internal voltage drops which were so great that it would no longer then have the power necessary to drive the thermal engine at a sufficient speed, at a low temperature.

In the prior art, solutions have been proposed to the above-described problem. A first known solution by the inventive body is based on the use of electronic converters for stepping up the voltage, in order to prevent a voltage level which is too low in the on-board network. A major disadvantage of these converters consists in the substantial costs which they introduce.

Another known solution proposes controlling the starter by means of two relays, timing, and a current-limitation resistor. In a first functioning phase, the duration of which is determined by the timing, an additional resistor is inserted in series in the starter circuit, and limits the initial current spike. In a second functioning phase, the additional resistor is taken out of the starter circuit in order to permit the passage of a sufficient current in the armature of the starter, and to allow an increase in the speed of the latter.

Documents EP2080897A2 and EP2128426A2 describe a starter of the above type. Apart from the disadvantage of the extra cost which the additional control relay, the timing and the current-limitation resistor of this additional relay involve, the introduction of this additional relay, comprising mobile mechanical parts which are subject to wear, has a negative impact on the resistance of the starter in terms of the number of starting cycles which the starter must be able to withstand without hindrance for the starter. The resistance of the starter in terms of the number of the starting cycles is a particularly severe constraint for starters which are designed for stop/start systems. In fact, starters of this type must withstand approximately 300,000 starting cycles, i.e. ten times more than the approximately 30,000 cycles required from the conventional starters.

In addition to the above-described disadvantages, the use of this second solution according to the prior art can prove to be inappropriate when compliance with a voltage range which is restrictive in terms of time is required by the motor vehicle manufacturer. A range of this type generally comprises a low voltage threshold corresponding to the first voltage threshold indicated above, and a high voltage threshold corresponding to the second voltage threshold. A rising voltage gradient is also provided in the range, between the low threshold and the high threshold.

The tests carried out by the inventive body, with the usual values of the manufacturers for the duration of the low threshold and the slope of the gradient of the range, show the difficulty which exists, with this second solution according to the prior art, of remaining within the range. In fact, it has been found that there is a risk of going outside the range at the level of its voltage gradient, when the battery voltage, after having been rectified once the initial current spike has been absorbed, drops again at the end of the timing, with the current passing through the armature of the starter then increasing substantially, because of the removal of the resistor for limitation of the current of the starter circuit. After thus going outside the range, the battery voltage may remain below the range for a certain period of time, and come back into the range only after the end of the rising voltage gradient, whereas the instant of the start of the high voltage threshold has already been reached.

BRIEF SUMMARY OF THE INVENTION

It is therefore desirable to propose improvements to the existing starters according to the prior art, such as to eliminate the above-described disadvantages, in particular for applications in motor vehicles concerning the automatic stop/restart function of the thermal engine.

According to a first aspect, the invention relates to a combination in an electric circuit of a starter for a motor vehicle, of a starter and a device for stepping up the battery voltage, the starter comprising an electric motor and an electromagnetic contactor, and the device for stepping up the battery voltage being designed to prevent a drop in the battery voltage caused by a current spike which intervenes in a power circuit of the starter when the latter is switched on. According to the invention, the device for stepping up the battery voltage is a filtering device of the inductive type which is mounted in series with the electric motor in the power circuit, and comprises a casing made of magnetic material, a primary winding circuit which is designed to be inserted in series in the power circuit, and a secondary winding circuit mounted as a short-circuit.

According to a particular characteristic, the casing made of magnetic material comprises a cylinder head and first and second core parts, these core parts closing cylindrical openings in the cylinder head, and forming a magnetic core which is contained in the cylinder head, and around which the primary and secondary winding circuits are arranged.

According to yet another characteristic, the primary winding circuit and the secondary winding circuit of the filtering device each comprise at least one conductor with a rectangular cross-section.

According to yet another characteristic, the primary winding circuit and the secondary winding circuit of the filtering device are formed from a coil with two parallel flattened conductors, which are wound with the two conductors in hand, the secondary winding circuit being produced by separating the parallel flattened conductors at the ends of the coil, and connecting together the two ends of one of the wound flattened conductors, such as to form the short-circuited secondary winding circuit, the other wound flattened conductor forming the primary winding circuit.

According to yet another characteristic, the conductors of the filtering device are wound on at least two layers with opposite directions of winding, one layer being wound according to a first, rising or descending direction, and the following layer being wound according to the other direction.

According to a particular embodiment, the filtering device is inserted in the power circuit of the starter, between a positive terminal of the vehicle battery and a power contact of the electromagnetic contactor.

According to another particular embodiment, the filtering device is inserted in the power circuit of the starter, between a power contact of the electromagnetic contactor and the electric motor. In this embodiment, the filtering device is advantageously secured on an exterior housing of the starter.

The invention described briefly above provides solutions which make it possible to ensure a high level of battery voltage according to the requirement for current, without this being to the detriment of the power of the starter, such that enough power can be transmitted to the thermal engine at low temperature, for starting from cold or restarting from warm in good conditions, i.e. with a high level of battery voltage at restarting, and sufficient speed from cold.

In addition, it will be noted in this case that the low-pass filtering provided by the device according to the invention also has a beneficial effect on the electric noise at high frequencies introduced by the mechanical switching operations of a brush—collector assembly of the electric motor. This provides an additional advantage in terms of EMC (electromagnetic compatibility), in particular the EMC by conduction, which improves the quality of the voltage on the on-board network of the vehicle.

BRIEF DESCRIPTION OF THE SEVERAL VIEWS OF THE DRAWING(S)

The invention will now be described in greater detail by means of particular embodiments of it, with reference to the appended drawings, in which:

FIGS. 5A and 5B are first and second exploded views in perspective showing the different components which form the filtering device according to the invention, respectively for the first and second embodiments of the device shown in cross-section in FIGS. 4A and 4B;

DETAILED DESCRIPTION OF THE INVENTION

Figure 1A:
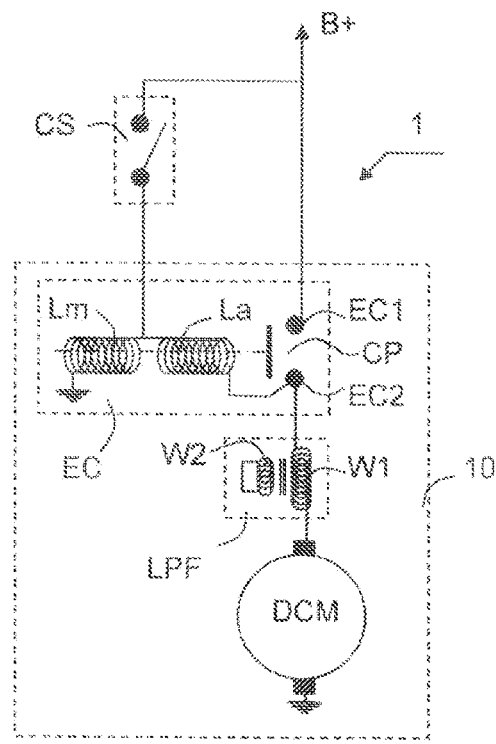
FIGS. 1A and 1B show first and second electric circuits of the starter, both incorporating a filtering device, and corresponding to first and second embodiments of the invention.
Figure 1B:
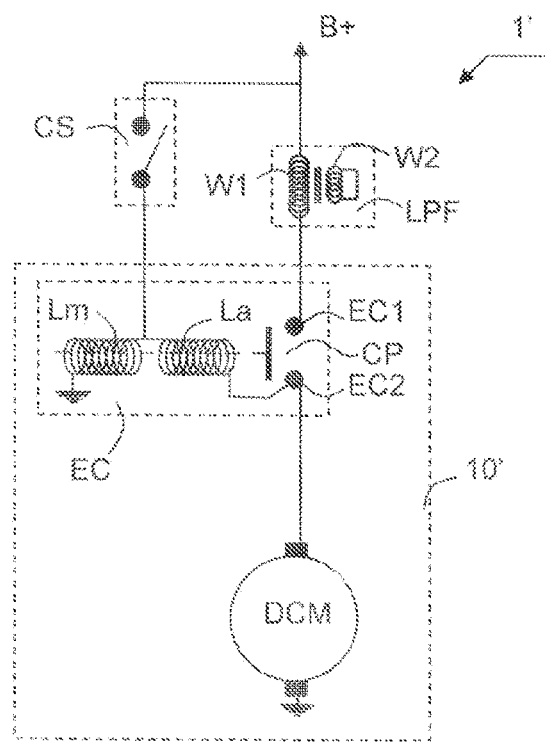

With reference to FIGS. 1A and 1B, a description is now provided of the first and second electric circuits of the starter 1 and 1', both comprising a filtering device LPF, and corresponding respectively to first and second embodiments of the invention.

As shown in FIGS. 1A and 1B, the electric circuits of the starter 1 and 1' vary only in the location of incorporation of the filtering device LPF in the power circuit of the starter. This power circuit is the one in which there circulates the power current of several hundred Amps when the starter is switched on. According to the invention, the power circuit is formed by the mounting in series of the filtering device LPF, an electric motor DCM, and a power contact CP of the starter, this power contact CP being that of an electromagnetic contactor EC of the starter (also known as the "solenoid" of the starter).

In the embodiment in FIG. 1A, the filtering device LPF equips the starter, which in this case has the reference 10, and is inserted in the power circuit between the electromagnetic contactor EC and the direct current electric motor DCM. The electromagnetic contactor EC and the direct current electric motor DCM form part of a motor vehicle starter, in a conventional manner.

Figure 6:
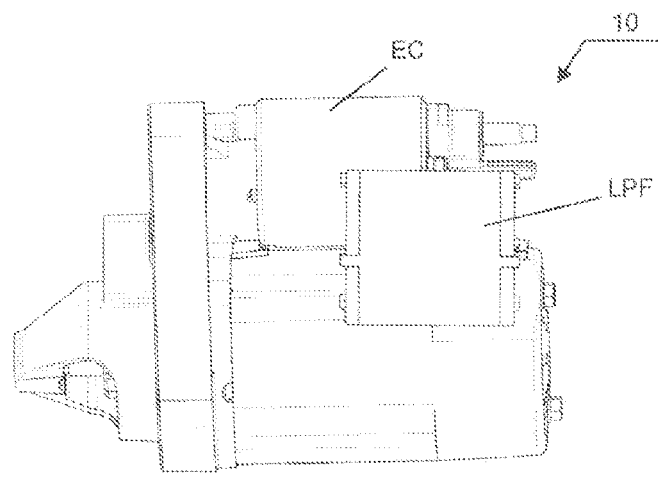
FIG. 6 is a lateral view of a starter equipped with the filtering device according to the invention.
Figure 7:
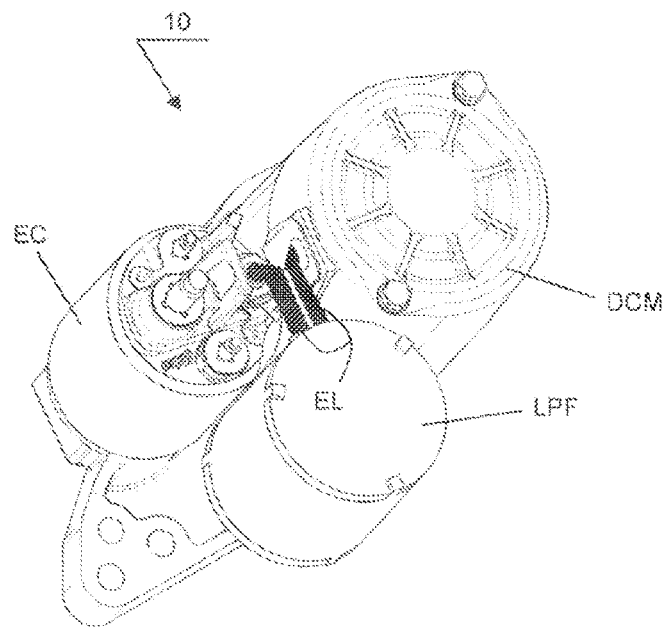
FIG. 7 is a rear view in perspective of the starter in FIG. 6.

FIGS. 6 and 7 show a specific embodiment of the starter 10 equipped according to the invention. In this embodiment, the filtering device LPF is secured mechanically on an exterior housing of the starter, in the vicinity of the contactor EC. Electrical connections EL between the contactor EC, the device LPF and the electric motor DCM are shown in FIG. 7. The device LPF is electrically mounted in series between the power contact (not shown in FIG. 7) of the contactor EC and the motor DCM, as in the configuration in FIG. 1A.

In the embodiment in FIG. 1B, the filtering device LPF is not integrated in the starter, which in this case has the reference 10', but is inserted in the power circuit between the positive terminal B+ of the battery and the power contact CP.

The contactor EC is in this case a conventional starter contactor, with a simple contact, and comprises a solenoid formed by a demand coil La and a maintenance coil Lm, and the power contact CP which comprises first and second terminals EC1 and EC2.

In the circuit 1 in FIG. 1A, the terminal EC1 is connected directly to the terminal B+ of the battery, and the terminal EC2 is connected to a positive terminal of the motor DCM by means of the filtering device LPF. In the circuit 1' in FIG. 2A, the terminal EC1 is connected to the terminal B+ by means of the filtering device LPF, and the terminal EC2 is connected directly to a positive terminal of the motor DCM. A negative terminal of the motor DCM is connected to the electric earth of the vehicle, for the two circuits 1 and 1'.

The closure of a starter contact CS of the vehicle commands the excitation of the coils La and Lm and the activation of the starter, according to a sequence which is well known to persons skilled in the art, and will not be described here. The contact CS is interposed between the terminal B+ of the battery and a common terminal of the coils La and Lm, to which first ends of the latter are connected. Second ends of the coils La and Lm are connected to the terminal EC2 and to the electric earth of the vehicle, respectively.

The strong initial current spike previously referred to intervenes at the closure of the power contact CP, when the motor DCM is supplied with full power. The terminal EC1 is then connected electrically to the terminal EC2 by the closure of the power contact CP, and the power current which supplies the motor DCM also passes through the filtering device LPF.

As shown by its electric diagram represented in FIGS. 1A and 1B, the filtering device LPF is in this case a device of the inductive type, which in this case is produced in the form of a transformer of the armoured type, with windings which are coupled magnetically. It will be noted that, depending on the applications, a simple inductor can be used to form the low-pass filtering device according to the invention. However, the embodiment with a transformer makes it possible to obtain more parameters for adjustment of the frequency response of the device LPF, according to the application. Thus, it is possible to optimise this response by regulating the inductors of the primary and secondary circuits, and the mutual inductor introduced by the coupling between these circuits. Typically, the equivalent inductance of the inductive filtering device LPF will be between 0.1 and 10 mH approximately for currents with an order of magnitude of 300 to 1000 A.

The device LPF thus comprises a primary winding circuit W1 and a secondary winding circuit W2. The primary winding circuit W1 is the one which is inserted in the power circuit of the starter. The secondary winding circuit W2 is short-circuited, as shown in FIGS. 1A and 1B.

Figure 2:
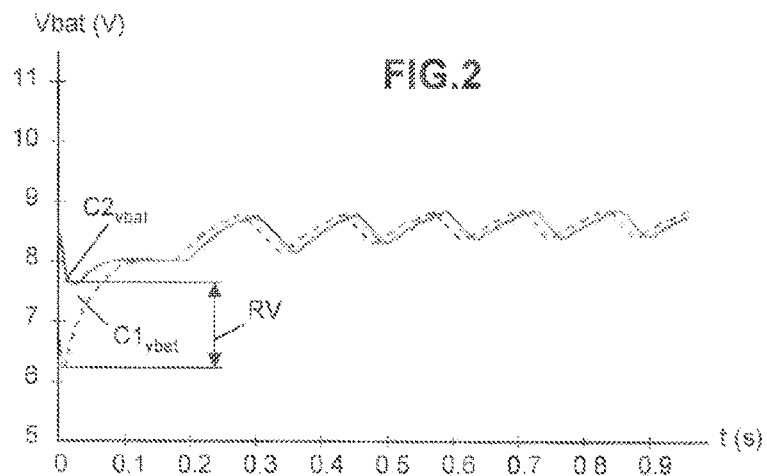
FIG. 2 shows battery voltage curves with and without integration of the filtering device promoted by the invention, in the electric control circuit of the starter.

With reference to FIG. 2, the main technical effect of the device LPF, consisting of stepping up the battery voltage, with the reference Vbat, is now described. This example involves a 12 V battery, as habitually found in motor vehicles.

FIG. 2 shows two curves $C1_{vbat}$ and $C2_{vbat}$ corresponding respectively to the battery voltage Vbat obtained with and without the filtering device LPF. The curve $C1_{vbat}$ is represented in a broken line. The curve $C2_{vbat}$ is represented in a solid line.

The curves $C1_{vbat}$ and $C2_{vbat}$ have been measured by the inventive body in the case of a starter circuit comprising a starter of the wound inductor type (the starter with the reference ESW20—registered trademark—made by the company VALEO). As shown in FIG. 2, the stepping-up RV introduced by the filtering device LPF on the voltage Vbat during the initial current spike has in this case been measured as 1.4 V.

Other tests carried out by the inventive body have shown that the invention makes possible a result which is even better in the case of a starter of the type with an inductor with permanent magnets. For example, the stepping-up RV of the voltage Vbat is 1.6 V with a starter with permanent magnets with the reference ESM18 (registered trademark) made by the company VALEO.

The effect obtained of stepping up the battery voltage is derived from the fact that, when the motor DCM is switched on, the initial current spike is cut off (attenuated by approximately half), because of the production of strong currents induced in the short-circuited secondary circuit, which oppose the sudden variation of magnetic flow which generates them.

The level of the battery voltage is stepped up significantly by the filtering effect of the high frequencies of the current spike frequency spectrum. On the other hand, at the frequencies which are much lower, and characterise the acyclical functioning of the thermal engine, the current variations are kept virtually intact, with very low attenuation (of only a few percent), and the quality of the driving of the thermal engine is thus not adversely affected. The filtering device LPF according to the invention is equivalent to a low-pass power filter with a high cut-off frequency which must be situated outside the frequency band corresponding to the acyclical functioning of the thermal engine.

With reference also to FIGS. 3, 4A, 4B and 5A, 5B, a detailed description is now provided of two embodiments of the filtering device LPF according to the invention.

Figure 3:
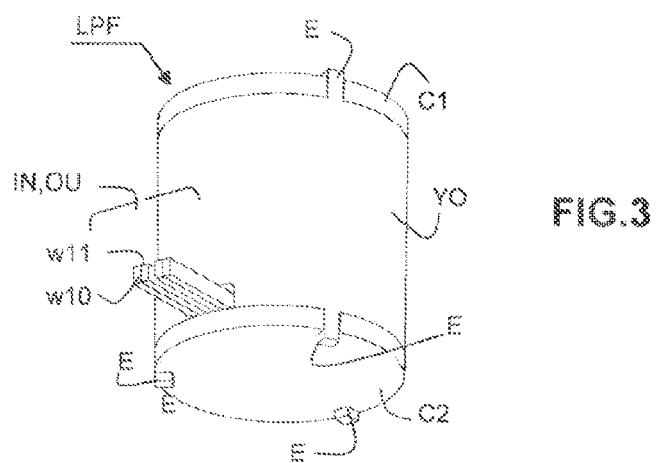
FIG. 3 is a global view in perspective of the filtering device according to the invention.

As shown in FIG. 3, as well as in FIGS. 6 and 7, the device LPF is externally in the form of a cylinder, with a form and volume close to those of the contactor EC. Typically, the device LPF can be produced with a diameter of between approximately 40 and 50 mm.

In the embodiments described here, the device LPF substantially comprises a casing made of magnetic material such as steel, for example a steel of the type XC6 or XC10, and primary W1 and secondary W2 winding circuits made of copper. The casing is formed by two core parts C1 and C2 and a cylinder head YO.

The core parts C1 and C2 are globally cylindrical parts which are inserted in opposite cylindrical openings in the cylinder head YO, such as to close the latter, and form a magnetic core contained in the cylinder head YO, around which the primary W1 and secondary W2 winding circuits are arranged. The diameter of the core parts C1, C2 inside the cylinder head YO is smaller than the inner diameter of the cylinder head YO, such as to leave a free space which is occupied by the primary W1 and secondary W2 winding circuits.

As shown in particular in FIG. 3, the cylinder head YO comprises lugs E which are inserted in corresponding notches provided in the core parts C1, C2. These lugs 2 are inserted by being clamped in the notches, and thus ensure the mechanical assembly of the device LPF. It will be noted in this case that this assembly must be carried out with the greatest possible care, so as to prevent any undesirable gap at the level of the junctions between the parts of the casing.

Figures 4A, 4B:
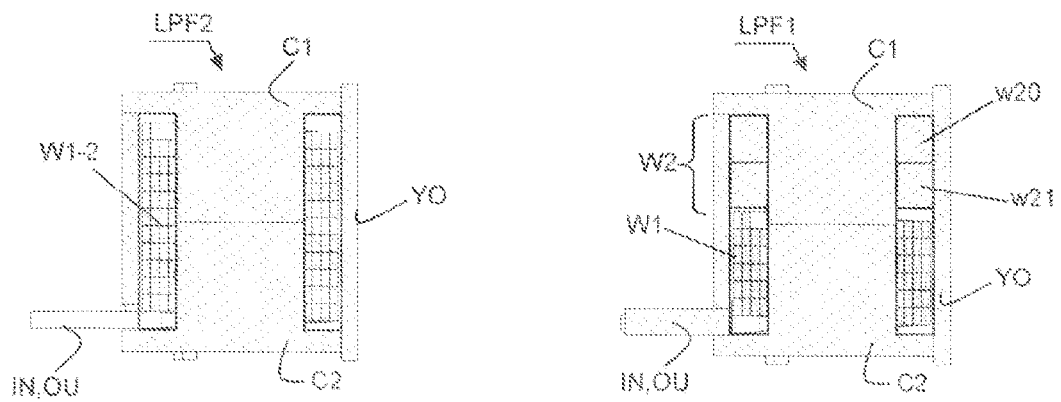
FIGS. 4A and 4B are first and second fuse in longitudinal cross-section, corresponding respectively to first and second embodiments of the filtering device according to the invention.

FIGS. 4A and 5A show a first embodiment LPF1 of the filtering device according to the invention.

The device LPF1 comprises a primary winding circuit W1 formed by two flattened parallel and contiguous conductors (conductors w10, w11 which can be seen in FIG. 3). The conductors w10, w11 are electrically insulated by a layer of varnish, and are wound with the two conductors in hand on two layers, in order to form the primary winding circuit W1. A first layer is wound according to a rising direction and the second layer is wound according to a descending direction. In this embodiment, the number of turns of the primary winding circuit W1 is 12. The two ends of the primary winding circuit W1 emerge on the exterior of the cylinder head YO and form the current input IN and current output OU of the device.

It will be noted that, in variant embodiments, the primary winding circuit W1 can be formed by a single flattened conductor or a number of flattened conductors greater than two. The selection of a number of conductors greater than one can be dictated by a constraint of substantial curvature, or by the need to limit the influence of the skin effect. In addition, in certain variants, the primary winding circuit W1 will be formed in a single layer or in a number of layers greater than two.

In the device LPF1, the short-circuited secondary winding circuit W2 comprises two copper conductors which form rings w20 and w21 with a rectangular cross-section, which are inserted in the core part C1. In other embodiments, it is possible to have a single ring, or a number of rings greater than two.

It will be noted that, in comparison with round wires, the use of conductors with a rectangular cross-section (flattened conductors of W2 and rings w20, w21) makes possible a higher level of filling of copper in the receptacle in the casing, which receptacle is reserved for the winding circuits W1 and W2.

The assembly of the filtering device LPF1 is shown in FIG. 5A. In addition to the components C1, C2, YO, W1 and W2 already described above, the device LPF1 also comprises elements which form electrical insulators, with the references IS1 to IS7. Preferably, the winding circuits W1 and W2 (w20, w21) will be insulated against one another and insulated against the metal casing (C1, C2 and YO).

The insulating elements IS1 to IS7 are formed for example from insulating paper. The elements IS1, IS5 and IS6 are wound such as to form insulating paper tubes. The elements IS2, IS3, IS4 and IS7 are crowns made of insulating paper.

The tubes IS1 and IS6 are inserted in the core parts C1 and C2 respectively, and cover the cylindrical surfaces of the latter, inside the cylinder head YO. The tube IS5 has a diameter which is substantially equal to the inner diameter of the cylinder head YO, and covers the inner surface of the latter.

The crowns IS2, IS3, IS4 and IS7 have an inner diameter which is slightly larger than the inner diameter of the core parts C1, C2, such as to be inserted on the latter, which are covered with the tubes IS1, IS6. The outer diameter of the crowns IS2, IS3, IS4 and IS7 is slightly smaller than the inner diameter of the cylinder head YO, such as to be inserted inside the latter, which is covered with the tube IS5.

The crown IS2 ensures the insulation of the upper part of the ring w20 relative to a part which forms an outer collar of the part of the core C1. The crown IS3 ensures the insulation of the lower part of the ring w20 relative to the upper part of the ring w21. The crown IS4 ensures the insulation of the lower part of the ring w21 relative to the upper part of the primary winding circuit W1. The crown IS7 ensures the insulation of the lower part of the primary winding circuit W1 relative to the part which forms an outer collar of the core part C2. It will be noticed in this case that the crowns IS2 and IS7 must be put into place carefully, in order to avoid any involuntary creation of a gap between a core part C1, C2 and the cylinder head YO, for example by interposition between these elements of a piece of insulating paper which forms these crowns.

FIGS. 4B and 5B show a second embodiment LPF2 of the filtering device according to the invention.

The device LPF2 differs from the device LPF1 substantially in the primary W1 and secondary W2 winding circuits. In the device LPF2, the copper rings w20 and w21 which form the secondary winding circuit W2 are eliminated. The secondary winding circuit W2 is formed in an imbricated manner with the primary winding circuit W1. In this case, a coil W1-2 is formed in a manner similar to the coil which forms the primary winding circuit W1 of the device LPF1. Two flattened conductors which are insulated by varnish, parallel and contiguous, are wound with the two conductors in hand on two layers. A first layer is wound according to a rising direction and the second layer is wound according to a descending direction. In comparison with the device LPF1, the coil W1-2 thus produced has more turns, i.e. 22 turns, and a greater height, thus filling with copper the space left empty by the elimination of the rings w20 and w21.

Starting from the coil W1-2, the secondary winding circuit W2 is produced by separating the parallel flattened conductors at the end of the coil W1-2 and connecting together the two ends of one of the wound flattened conductors, such as to form the short-circuited secondary winding circuit W2. The other wound flattened conductor forms the primary winding circuit W1, and its ends which emerge from the cylinder head YO thus form the current input and output IN and OU.

In comparison with the device LPF1, this embodiment LPF2 has the advantage of a substantially increased magnetic coupling coefficient, close to 1, between the primary W1 and secondary W2 winding circuits. In addition, the number of turns is greater than that of LPF1, which makes it possible to increase the inductance values of the device. The density of current in the circuit W1 is lower in LPF2 than in LPF1, because of the smaller volume of copper. However, the initial current spike with a very high density has a very short duration (a few milliseconds), and, at lower frequencies, after the current spike, as a result of good heat exchanges with W1, the secondary winding circuit W2 compensates for the increase in the Joule losses ($RI^2$) caused by the decrease in the volume of copper in the primary circuit W1, thus making it possible to obtain a total heat capacity equivalent to that of the device LPF1.

The invention claimed is:

1. An electric circuit (1, 1') for starting a thermal engine of a motor vehicle, said electric circuit (1, 1') including a starter (10, 10') and a device for stepping up the battery voltage;
    said starter (10, 10') comprising an electric motor (DCM) and an electromagnetic contactor (EC);
    said device for stepping up the battery voltage configured to prevent a drop in the battery voltage (Vbat) caused by a current spike occurring in a power circuit of said starter (10, 10') when said starter (10, 10') is switched on;

said device for stepping up the battery voltage is a filtering device of the inductive type mounted in series with said electric motor (DCM) in said power circuit;

said filtering device comprising a casing made of magnetic material (C1, C2, YO), a primary winding circuit (W1) configured to be inserted in series in said power circuit, and a secondary winding circuit (W2) mounted as a short-circuit.

2. The electric circuit (1, 1') according to claim 1, wherein said casing made of magnetic material of said filtering device comprises a cylinder head (YO) and first and second core parts (C1, C2); wherein said core parts (C1, C2) closing cylindrical openings in said cylinder head (YO), and forming a magnetic core which is contained in said cylinder head (YO), and around which said primary (W1) and secondary (W2) winding circuits are arranged.

3. The electric circuit (1, 1') according to claim 1, characterized in that said primary winding circuit (W1) and said secondary winding circuit (W2) of said filtering device each comprise at least one conductor with a rectangular cross-section.

4. The electric circuit (1, 1') according to claim 1, wherein said primary winding circuit (W1) and said secondary winding circuit (W2) of said filtering device are formed from a coil (W1-2) with two parallel flattened conductors, which are wound with the two conductors in hand;

said secondary winding circuit (W2) being produced by connecting together the two ends of one of said wound flattened conductors of the said coil (W1-2), such as to form said short-circuited secondary winding circuit (W2);

the other wound flattened conductor of the said coil (W1-2) forms said primary winding circuit (W1).

5. The electric circuit (1, 1') according to claim 4, wherein said conductors of said filtering device are wound on at least two layers with opposite directions of winding, one layer being wound according to a first, rising or descending direction, and the following layer being wound according to a second direction opposite to said first direction.

6. The electric circuit (1, 1') according to claim 1, wherein said filtering device (LPF) is inserted in said power circuit of the starter (1'), between a positive terminal (B+) of the vehicle battery and a power contact (CP) of said electromagnetic contactor (EC).

7. The electric circuit (1, 1') according to claim 1, wherein said filtering device (LPF) is inserted in said power circuit of the starter (1) between a power contact (CP) of said electromagnetic contactor (EC) and said electric motor (DCM).

8. The electric circuit (1, 1') according to claim 7, wherein said filtering device (LPF) is secured on an exterior housing of the starter.

* * * * *